INVENTORS
ARTHUR O. CODNEY
ROBERT M. BAILEY
Kwis Hudson & Kent
ATTORNEYS

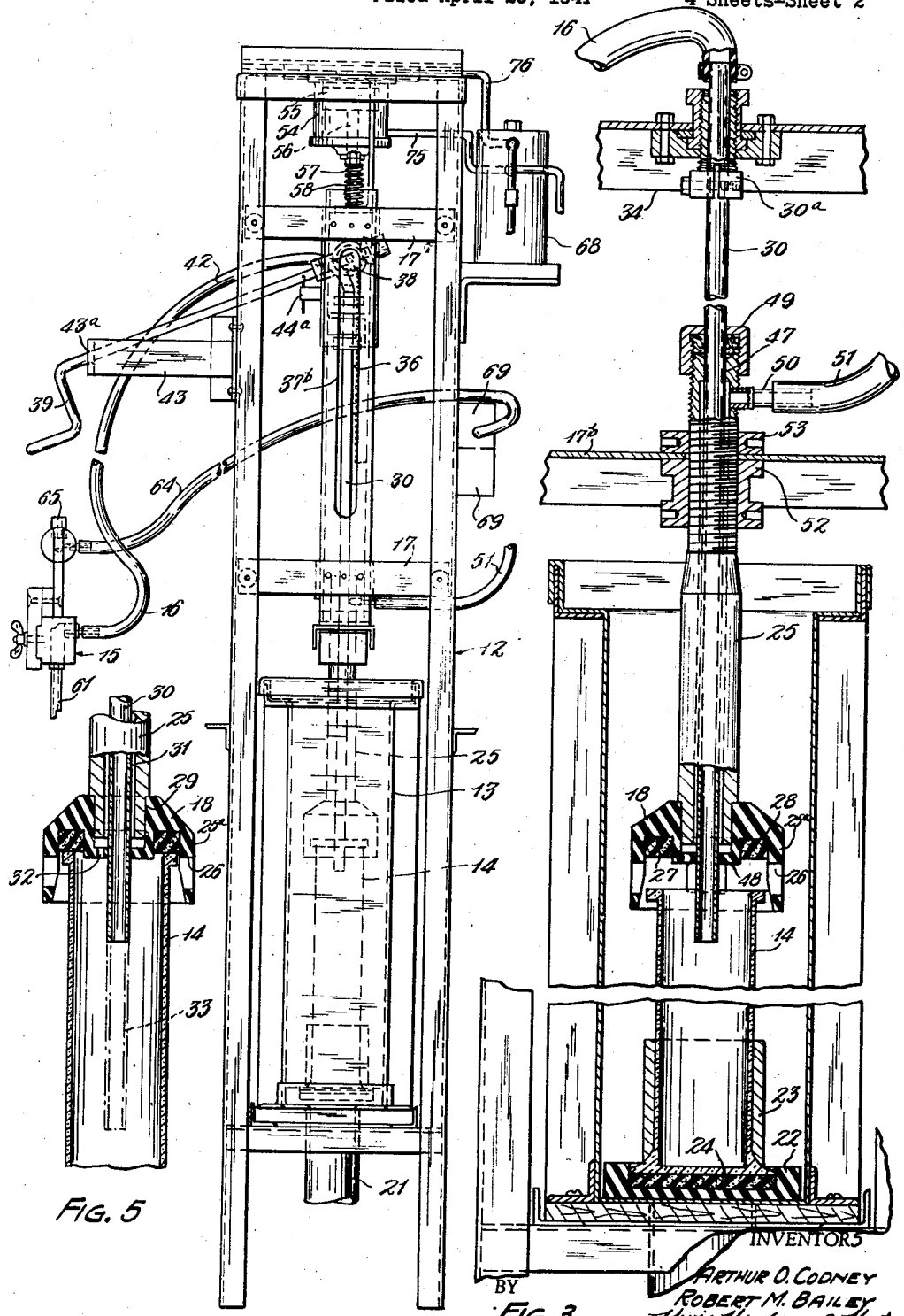

May 18, 1943  A. O. CODNEY ET AL  2,319,532
LIQUID DISPENSING APPARATUS
Filed April 29, 1941  4 Sheets-Sheet 3

INVENTORS
ARTHUR O. CODNEY
ROBERT M. BAILEY
ATTORNEYS

May 18, 1943  A. O. CODNEY ET AL  2,319,532
LIQUID DISPENSING APPARATUS
Filed April 29, 1941  4 Sheets-Sheet 4

INVENTORS
ARTHUR O. CODNEY
ROBERT M. BAILEY
BY Kivis Hudson & Kent
ATTORNEYS

Patented May 18, 1943

2,319,532

UNITED STATES PATENT OFFICE 2,319,532

LIQUID DISPENSING APPARATUS

Arthur O. Codney, Cleveland Heights, and Robert M. Bailey, Cleveland, Ohio, assignors to Willard Storage Battery Company, Cleveland, Ohio, a corporation of West Virginia Application April 29, 1941, Serial No. 390,944

21 Claims. (Cl. 221—67)

This invention relates to liquid dispensing apparatus, and more particularly to improved apparatus of this kind with which measured or predetermined volumes of liquid can be delivered or dispensed for various purposes, but which is particularly suitable for filling the cells of storage batteries with a predetermined volume of acid or electrolyte.

In the production of storage batteries it has been the usual practice to fill newly assembled batteries with a special low gravity electrolyte and then subject them to a forming or developing charge. After this has taken place the low gravity electrolyte is dumped out of the batteries and they are refilled with an electrolyte of a sufficiently high gravity that, when combined with the low gravity electrolyte remaining in the plates and separators after the dumping operation, it will result in an electrolyte of a desired final gravity. Heretofore the refilling of the batteries with acid of the higher specific gravity has been accomplished by the use of vacuum filling apparatus such as that disclosed in U. S. Patent No. 1,956,968 granted May 1, 1934, but this has resulted in many disadvantages which the present apparatus seeks to overcome.

One serious objection to the use of vacuum filling apparatus in connection with the refilling of storage batteries is that the cells are necessarily filled to overflowing because it is impractical to stop the filling operation at the exact instant that the cells become filled. It has been found in practice that roughly 10% to 30% more acid flows through the cells than is actually required to fill them to the specified point and this flow of excess acid tends to wash or scavenge the retained low gravity acid out of the plates and separators, and inasmuch as this scavenging action is not constant the final specific gravity of the refilled cells will not be constant in value and an irregular product is likely to be the result. There are many other disadvantages connected with the use of vacuum filling apparatus in the production of storage batteries such as the more complex equipment required and the difficulty in maintaining the system tight at numerous points where air tends to leak in. Vacuum filling apparatus also requires a special filling head or portable tool designed to fit the filling openings of the particular size or type of battery being filled and the operator is required to forcibly hold the filling head against the battery openings to maintain a vacuum seal and this is not only tedious for the operator, but the application of pressure to the cell covers is undesirable because it may result in damage to the battery. In the use of such vacuum filling apparatus there may also be a considerable amount of acid wasted and, moreover, it is very difficult to keep the highly corrosive acid from penetrating all parts of such a vacuum system and producing rapid deterioration.

It is, therefore, an object of this invention to provide improved liquid dispensing apparatus with which measured or predetermined volumes can be rapidly and accurately delivered at a desired point for filling the cells of storage batteries or for other purposes and with which the above-mentioned disadvantages can be overcome.

Another object of our invention is to provide improved liquid dispensing apparatus of this character which does not require a filling head to be forcibly held against the openings of the battery cells or other vessels to be filled and does not create a flow of liquid through the cells or vessels in excess of that required to fill them.

Still another object of our invention is to provide improved liquid dispensing apparatus embodying a container submerged in a supply tank and adapted to be alternately opened and closed, and from which a measured or predetermined volume of liquid will be forced by air pressure at the will of the operator.

A further object of our invention is to provide improved liquid dispensing apparatus of this character in which the volume of liquid to be dispensed from the submerged container can be selected or adjusted by varying the extent to which a discharge tube extends into such container.

Yet another object of our invention is to provide improved battery filling apparatus embodying a plurality of submerged containers having removable covers and in which power operated means is employed for opening the covers to admit liquid to the containers and reapplying the covers to seal the containers.

A further object of our invention is to provide dispensing apparatus of this character in which the containers are connected with the delivery nozzles of a filling head or portable tool by conduits and the operation of the power means for moving the container covers is controlled by means located on such filling head.

Our invention may be further briefly summarized as consisting in certain novel combinations and arrangements of parts hereinafter described and particularly set out in the appended claims.

In the accompanying sheets of drawings,

Fig. 2 is an end view of the apparatus;

Fig. 3 is a partial vertical sectional view taken through the apparatus as indicated by line 3—3 of Fig. 1 and showing the apparatus on a somewhat larger scale and with the measuring container open;

Fig. 4 is a partial side elevation showing a portion of one unit of the apparatus of Fig. 1 on a larger scale and with portions thereof broken away;

Fig. 5 is a partial vertical sectional view taken through one of the measuring containers and showing the cover in closed position thereon;

Further reference will now be made to the drawings for the purpose of describing our liquid dispensing apparatus in greater detail and although the drawings illustrate but one embodiment of the invention, it will be understood, of course, that the invention is not limited to the particular apparatus disclosed, but may be embodied in various other arrangements of similar apparatus. Likewise it should be understood that although the illustrated embodiment is hereinafter described in connection with battery filling, the invention is not limited to this use but is also applicable to various liquid dispensing operations.

Figure 1:
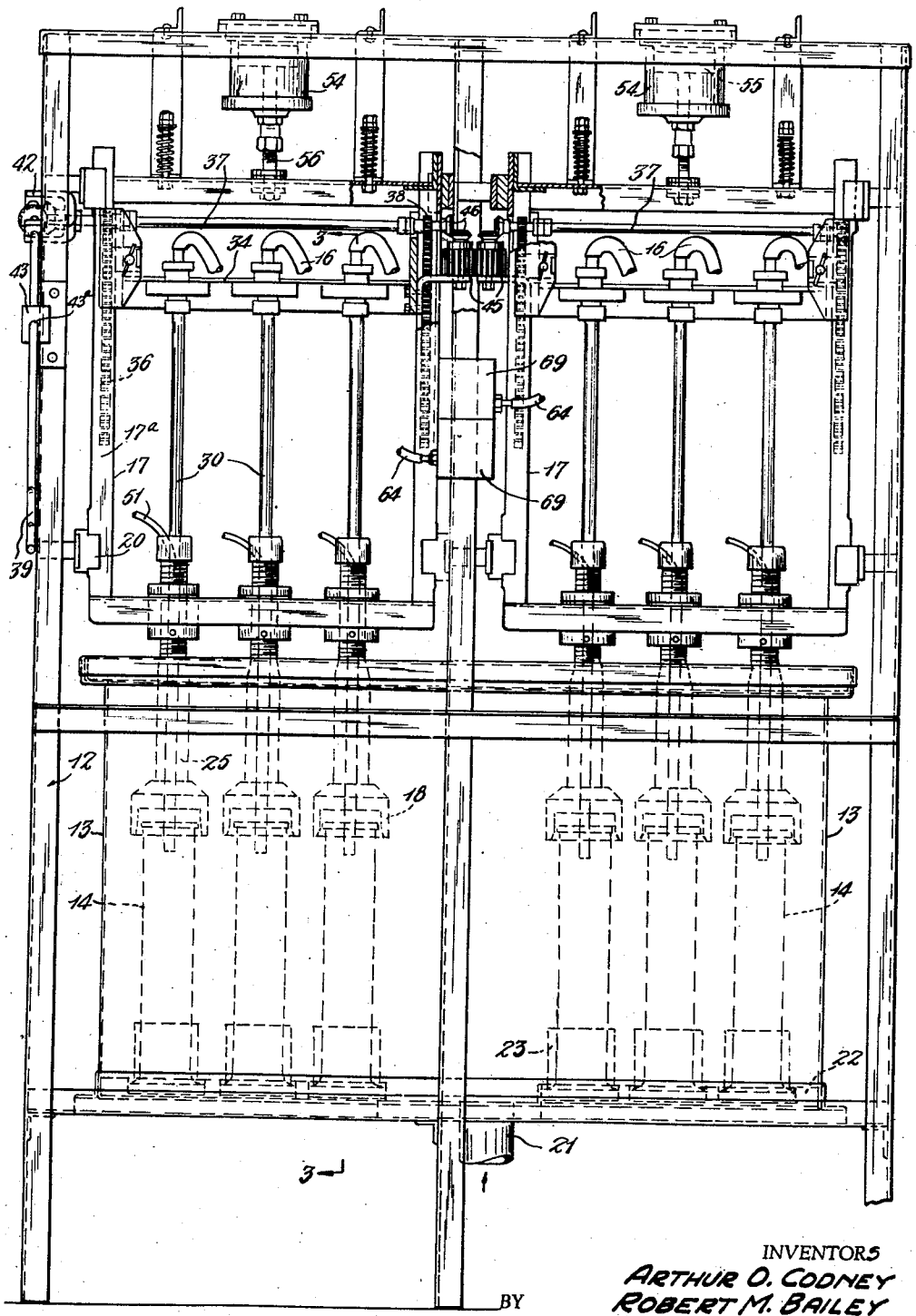
Fig. 1 is a side elevation, with portions broken away, showing liquid dispensing apparatus constructed according to our invention.

As will be seen from Figs. 1 and 2 of the drawings, the present embodiment of the apparatus comprises in general a frame 12, having thereon a tank 13 adapted to contain a supply of liquid, such as battery electrolyte or acid, and in which a plurality of measuring containers 14 are arranged so as to be normally submerged in the liquid. The apparatus also includes a portable device or filling head 15 which is adapted to be applied to the battery to be filled and is connected with the containers 14 by conduits 16. The apparatus also embodies a movable frame or carrier 17 carrying a plurality of covers 18 for the containers 14 and which frame may be power operated.

In the present embodiment of our apparatus we show the tank 13 as being of a size to accommodate two sets of the measuring containers or jars 14 and we also show two of the portable filling heads 15 and two of the power operated frames or carriers 17. Each set of jars with its power operated frame 17 and filling head 15 constitutes one dispensing unit which can be used simultaneously with, or independently of, the other unit. To simplify the description of our apparatus, we shall refer particularly to the unit on the left-hand side of the machine, as seen in Fig. 1, although the description is also generally applicable to the right-hand unit.

The main frame or support 12 may be of any suitable construction and may comprise a framework composed of structural steel members and adapted to receive the tank 13 in the lower part thereof. In the upper portion of the support 12 we provide pairs of substantially vertically aligned guides 20 forming a guideway for the movable frame 17 and which permits movement of the latter toward and from the tank 13. The frame 17 may be generally rectangular in shape and may be formed of suitably arranged structural steel members, preferably channel shaped members as shown in this instance. The upright members 17a forming the sides of the frame 17 are slidably movable in the guides 20 and may be connected adjacent their lower and upper ends by transverse channel shaped members 17b and 17c.

The tank 13 may be formed of lead or other material which will resist the corrosive action of the acid and may be of a size to contain a suitable supply of the acid or other liquid to be dispensed. Additional acid may be supplied to the tank through the pipe 21 at a rate such that the measuring containers 14 will always be submerged in the liquid.

The measuring containers 14 may be in the form of open topped upright substantially cylindrical glass jars, as seen in Fig. 3, and may be retained in the desired position at the bottom of the tank by being mounted in recesses of a hard rubber block 22 in which they are held by suitable retaining means or by weights in the form of lead sleeves 23 surrounding the jars. The jars may be suitably cushioned against shock and vibration by resilient pads 24 of semi-soft or sponge rubber provided thereunder in the recesses of the block 22. Inasmuch as storage batteries ordinarily have three cells, we have shown three of the measuring jars 14 in each dispensing unit, but it will be readily seen that the number of such jars is variable and that either one or any desired number of jars could be provided.

Each of the jars 14 is provided with a removable cover 18 which is suitably supported adjacent the top of the container as by means of a hollow spindle 25 depending from the frame 17. The cover 18 may be of cup-like form, as shown in Figs. 3 and 5, and may be formed of hard rubber or any other suitable material. The depending annular skirt 25a of the cover may be provided with a plurality of openings 26 through which liquid may flow readily from the tank into the jar when the cover is moved to its open position, as shown in Fig. 3. The cover is provided interiorly thereof with an annular groove 27 in which a yieldable sealing ring or gasket 28, formed of sponge rubber or other suitable material, is mounted for sealing engagement with the top of the jar 14 when the cover is moved downwardly to its closed position thereon, as shown in Fig. 5. The cover may be suitably mounted on the lower end of the hollow spindle 25 as by providing the top of the cover with a recess 29 in which the lower end of the spindle engages. The relatively large mouth or opening of the open-topped jars 14 and the cover openings 26 provide an inlet passage of a size to permit the jars to be filled very quickly when the covers 18 are lifted. It will be seen from Figs. 3 and 5 that the skirt 25a of the cover 18 telescopes around the top of the jar 14 and that the movement of the cover from closed to open position is somewhat less than the depth or length of the skirt. The advantage of this arrangement is that the skirt will at all times prevent the jar from tilting or shifting out of proper position to be sealingly engaged by the cover.

As shown in the drawings we provide a discharge tube or pipe 30 for each measuring container 14 and arrange these tubes so that they extend through the hollow spindles 25 and through the covers 18 into the respective containers. These tubes are preferably glass tubes although they may be formed of metal or other suitable material. As shown in Figs. 3 and 5 the openings of the hollow spindles 25 are of a larger size than the tubes 30 so that a passage 31 is provided therebetween through which air under pressure can be introduced into the containers 14, after the latter have been closed, to thereby force the desired volume of liquid or acid out through the tubes. To connect the air passages 31 of the spindles 25 with the respective containers 14, we provide one or more openings 32 through the covers 18 at a point inwardly of the sealing gasket 28.

The tubes 30 are open at their lower end, as shown in Figs. 3 and 5, so that liquid from the containers 14 may be forced therethrough by the air pressure supplied to the containers while the covers 18 are closed. The amount of liquid dispensed from each container will be determined by the volume of that portion or section of the container into which the tube 30 extends. The volume of liquid to be dispensed can be varied by either raising or lowering the tube 30 in the spindle 25 so that it will extend into the container 14 either a smaller distance than that shown in Fig. 5 or a greater distance as represented by the broken lines 33.

To permit of such adjustment of the tubes 30 we may provide the frame 17 with a transversely extending movable bar or slide 34 to which the upper ends of the tubes are connected by suitable clamping means 30a. The slide 34 may be provided at its ends with pairs of spaced guide plates 35 which straddle the upright side members 17a of the movable frame 17 and have slidable engagement with the latter so that as the slide 34 is raised or lowered it will slide on the side members 17a. The slide 34 may be raised or lowered by any suitable actuating means such as by providing racks 36 on the side members 17a and a transverse rotary shaft 37 on the slide having pinions 38 meshing with such racks. This shaft is journaled in suitable bearings 37a provided on the slide 34 and moves up and down with the latter. The ends of this shaft extend through the slots 37b of the upright side members 17a.

The pinion shaft 37 may be rotated by means of a crank 39 having its inner end connected with this shaft by the bevel gears 40 and 41. The bevel gear 41 is pinned to the outer end of the shaft 37 and the gear 40 is pinned to the inner end of the crank 39, such inner end being journaled in the arms of a bracket 42 which is rotatable or oscillatable on the shaft 37. When the crank 39 is rotated to adjust the tubes 30 upwardly or downwardly, the slide 34 is shifted correspondingly on the frame 17 and carries the pinion shaft with it. During this upward or downward movement of the slide 34 and the pinion shaft 37, the bracket 42 and the inner end of the crank 39 will also move upwardly or downwardly and this will result in a swinging movement of the crank. The outer end of the crank is supported by a bracket 43 having an opening 43a through which the crank extends and which is so formed as to permit such swinging of the crank when the slide 34 moves upwardly or downwardly. When the slide 34 has been adjusted to the desired setting it can be locked to the frame 17 by a clamping member 44 which is adapted to be drawn against a flange of the channel shaped side member 17a by the screw 44a.

The right-hand dispensing unit may have its own slide adjusting crank 39, in which case the slides of the two units will be independently adjustable, or as shown in this instance the adjacent ends of the pinion shafts 37 of the two slides 34 may be connected with each other through the idler gears 45 and the pairs of bevel gears 46. When the pinion shafts are interconnected by such gearing the two slides 34 with their tubes 30 can be adjusted simultaneously by rotating the crank 39.

As shown in Fig. 3 the tubes 30 may be guided in their respective hollow spindles 25 by providing a bearing or guiding surface 47 on each spindle adjacent its upper end in which the tube is slidable and a bearing or guide surface 48 on the cover 18 and through which the lower end of the tube is slidable. Suitable packing glands 49 may be provided on the upper ends of the spindles 25 to prevent leakage of air around the tubes from the passages 31. Air under pressure may be supplied to the passages 31 through nipples 50 with which air supply conduits 51 are connected. The upper ends of the spindles 25 may be connected with the transverse member 17b of the frame 17 by any suitable means such as clamping nuts 52 and 53 threaded on the spindles and located on opposite sides of openings in the frame member through which the spindles extend. The nuts 52 and 53 provide for vertical adjustment of the spindles 25 on the frame 17 so that the covers 18 will close tightly on the containers 14.

In moving the covers 18 to open and closed positions, power may be applied to the movable frame 17 in any suitable manner, but for this purpose we prefer to employ a fluid pressure cylinder 54 which is mounted on the support 12 adjacent the top thereof. A piston 55 operable in the cylinder is connected with the transverse member 17c of the frame 17 by the piston rod 56. The weight of the frame 17 and the parts carried thereby may be counterbalanced, or partially counterbalanced, by suitable compression springs 57 which are arranged on the support 12 so as to be subjected to compression by pull rods 58 which are connected with the transverse bar 17c of the frame 17.

Figures 6, 7, 8:
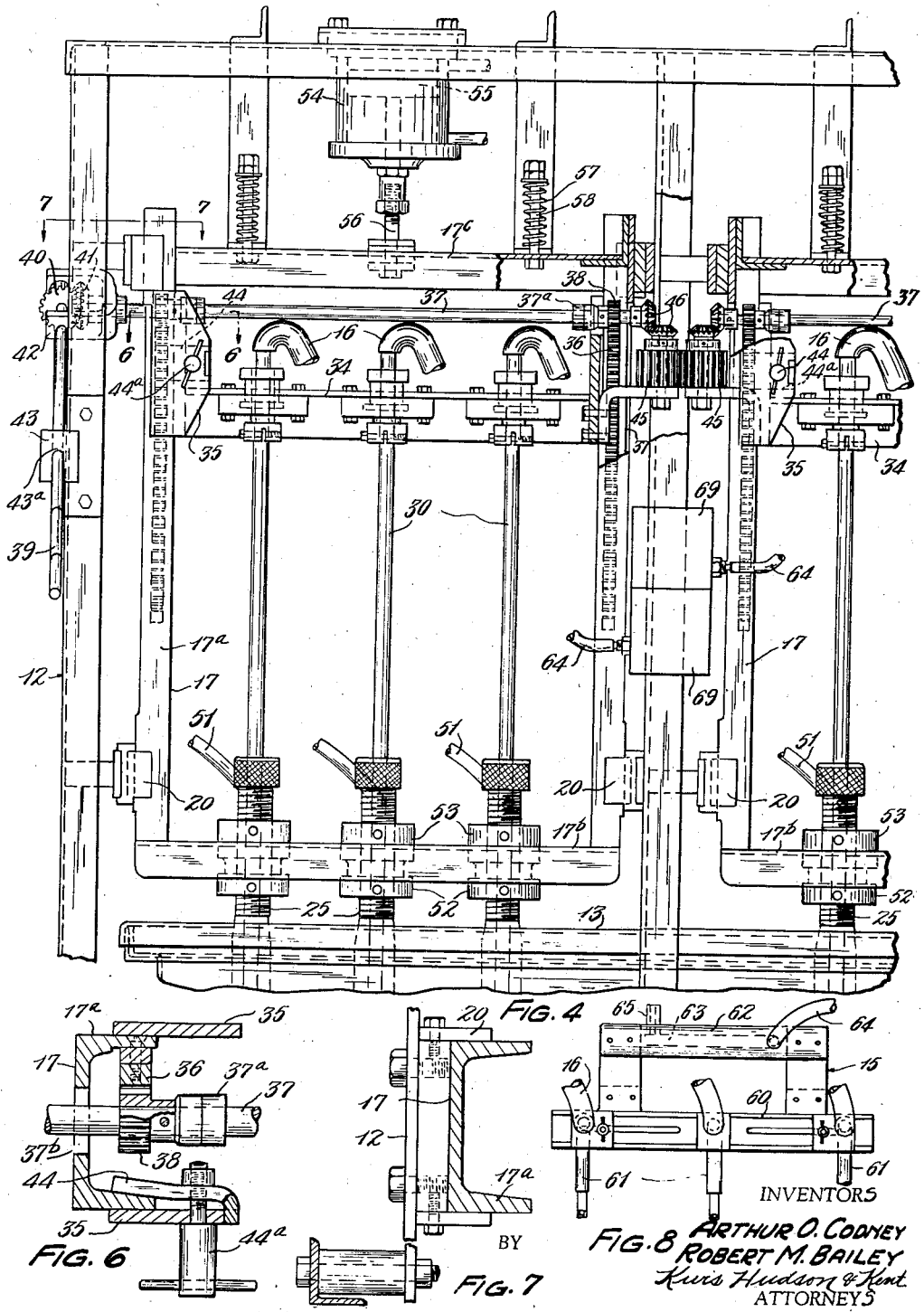
Fig. 6 is a partial transverse sectional view taken on line 6—6 of Fig. 4.
Fig. 7 is another partial transverse sectional view taken on line 7—7 of Fig. 4.
Fig. 8 is a detached side view showing the portable filling head.
Figure 9:
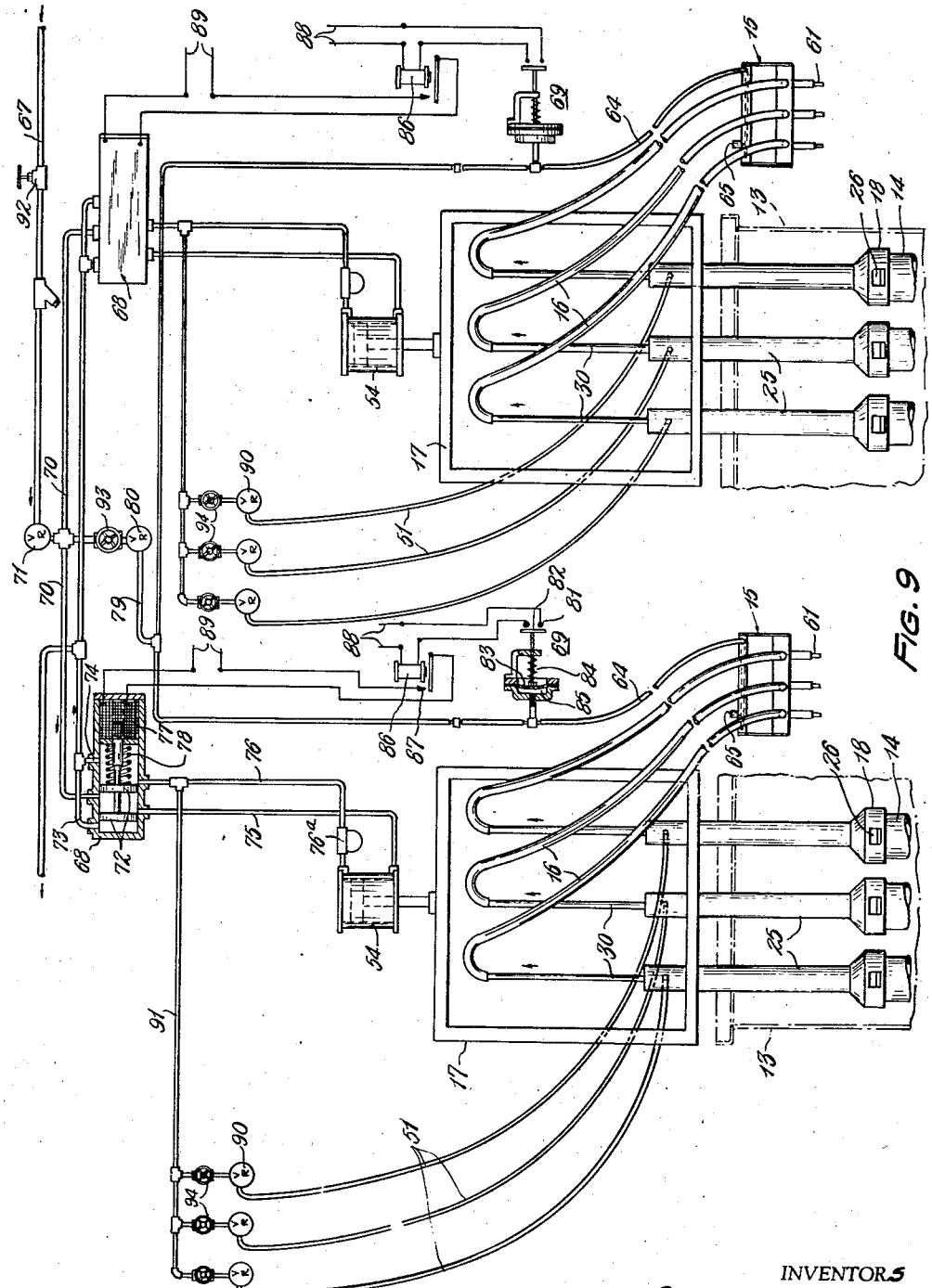
Fig. 9 is an elevational view, more or less diagrammatic in form and with portions in section, further illustrating our liquid dispensing apparatus.

As we have stated above, each unit of our apparatus includes one of the portable filling heads 15. This filling head is best illustrated in Figs. 2, 8 and 9 and may comprise a body 60 carrying a plurality of nozzles 61 and having a handle portion 62 by which the head can be conveniently held or carried. In this instance the filling head is provided with three of the nozzles 61 which correspond in number and spacing with the usual filling openings of a storage battery. The end nozzles may be adjustably connected with the body 60 so that the spacing of the nozzles may be varied. The handle 62 may have an air passage 63 therein to one end of which is connected a flexible air pressure supply conduit 64 and in the other end of which is an air discharge orifice or nozzle 65. This orifice is normally open but can be readily closed by a thumb or finger of the operator. The three delivery nozzles 61 are connected respectively with the three discharge tubes 30 by means of the flexible conduits 16.

Compressed air may be used as the motive fluid for actuating the frame 17 to open and close the container covers 18 and as the pressure fluid which is introduced into the containers for forcing the acid out of the latter to the delivery nozzles 61 of the filling head 15. In Fig. 9 we show an air pressure supply line 67 representing a source of air under pressure and which may lead from a compressor or air pressure storage tank. The supply of air pressure to the air cylinder 54 for the actuation of the movable frame 17 and the supply of air pressure to the interior of the measuring containers 14 is controlled by a solenoid valve 68 which is in turn controlled by a pressure responsive switch 69. This switch is responsive to the air pressure in the conduit 64 leading to the normally open orifice 65 of the filling head 15.

A pipe 70 is connected with the supply line 67 through a pressure reducing valve 71 and leads into the solenoid valve 68 at a point between the spaced valve elements 72 thereof. Exhaust outlets 73 and 74 are connected with the solenoid valve 68 outwardly of the valve elements 72. Pipes 75 and 76 connect opposite ends of the air cylinder 54 with the solenoid valve 68 so that when air under pressure is supplied to one end of the cylinder the exhaust air will be discharged from the other end. A lubricant feeding device 76a may, if desired, be located in the pipe connection 76. The valve elements 72 may be shifted in one direction by energization of the solenoid 77 and in the opposite direction by the spring 78 when the solenoid is deenergized.

The air conduit 64 may be connected with the air supply pipe 70 through a conduit 79 and a pressure reducing valve 80. The pressure responsive switch 69 may comprise stationary and movable contacts 81 and 82 the latter of which may be moved to closed position by a diaphragm 83 and may be moved to open position by a compression spring 84. The chamber 85 of the housing carrying the diaphragm 83 is connected with the air conduit 64 so that an increase in pressure in the latter will cause closing of the switch and a decrease in pressure in the conduit will permit the switch to be opened by the spring 84. The switch contacts 81 and 82 may be located directly in the energizing circuit for the solenoid 77, or preferably as here illustrated, may be located in the energizing circuit of a relay 86 having contacts 87 controlling the solenoid circuit. Current from a suitable source or sources may be supplied to the relay circuit and to the solenoid circuit by the pairs of line conductors 88 and 89.

It is desirable to have the air pressure supplied to the containers 14 at substantially the same time as, or immediately after, the closing of the covers 18 and, therefore, we connect the conduits 51 to the air pipe 76 (see Fig. 9) through which air is supplied to the cylinder 54 to cause closing of the covers. The conduits 51 may be connected with the pipe 76 through a plurality of pressure reducing valves 90 and a common conduit 91.

When our dispensing apparatus is to be placed in operation the stop valves 92, 93 and 94 in the pipe lines are opened and a supply of acid is provided in the tank 13. A small volume of air will now start flowing through the conduit 64 and will escape to atmosphere through the normally open orifice 65. The operator grasps the filling head 15 and applies the same to a battery by inserting the nozzles 61 through the battery filling openings. He then applies his thumb to the orifice 65 closing the same and thereby causing a pressure to build up in the conduit 64 and in the diaphragm chamber 85. This will cause closing of the switch contacts 81 and 82 thereby energizing the solenoid 77. The switch elements 72 are thereupon shifted to a position to cause air pressure to be supplied to the upper end of the cylinder 54 through the pipe 76. This will cause the frame 17 to be shifted downwardly thereby closing the covers 18 on the measuring containers 14.

The energization of the solenoid valve 68 also causes air pressure to be supplied through the conduits 91 and 51 to the passages of the hollow spindles 25 and thence into the measuring containers 14. This air pressure forces acid out of the containers through the tubes 30 and the conduits 16 to the nozzles of the filling head 15. When the measured volume of acid, as determined by the depth to which the tubes 30 extend into the containers 14, has been delivered into the battery cells, the operator removes his thumb from the orifice 65 causing the pressure in the conduit 64 to be relieved. The operator knows when the measured volume has been delivered from the containers 14 by seeing or hearing air bubbles in the tubes 30 or at the filler head nozzles 61. Thereupon the pressure switch 69 is opened deenergizing the relay 86 and the solenoid 77. This permits the spring 78 to shift the solenoid valve to the position shown in Fig. 9 thereby connecting the lower end of the cylinder 54 with the air pressure supply line through the pipe 75 and simultaneously connecting the upper end of the cylinder with the exhaust pipe 73. This will cause the frame 17 to be moved upwardly to lift the covers 18 from the tops of the measuring containers 14. The lifting of the covers 18 will permit acid from the tank 13 to immediately flow into the containers through the cover openings 26 and as soon as the containers have been filled and the filling head 15 applied to another battery the operation can be repeated by the operator again applying his thumb to the orifice 65.

Although a manually operable switch could be used instead of the switch 69 and could be located on the filling head 15, I prefer to employ the pressure responsive switch 69 and its control orifice 65 because then the operator does not come in contact with any electrical apparatus whatever. This arrangement is preferable because the acid is highly conductive of electricity and the operator might be subjected to accidental electric shocks if he were to come into contact with electrical apparatus while handling the filling head 15.

From the foregoing description and the accompanying drawings it will now be readily seen that we have provided improved liquid dispensing apparatus which can be used for any dispensing operation where it is desirable to deliver a predetermined volume of liquid, but which is especially suitable for rapidly and economically filling the cells of storage batteries with acid or electrolyte. It will be seen furthermore that the operation of the above-described apparatus is very simple and requires only the closing of the normally open air discharge orifice by the operator's thumb whereupon a predetermined volume of acid will be delivered into the battery cells and as soon as the operator removes his thumb from the orifice the measuring containers will be automatically refilled. In using this apparatus it will be seen furthermore that the operator is not required to forcibly hold the filling head 15 against the battery as has been necessary heretofore with vacuum filling apparatus and since a predetermined volume is delivered during each dispensing operation all of the batteries will be filled to exactly the same level.

While we have illustrated and described our improved dispensing apparatus in more or less detail it will be understood, of course, that we do not wish to be limited to the precise details and arrangements herein disclosed but regard our invention as including such changes and modifications as do not involve a departure from the spirit of the invention and the scope of the appended claims.

Having thus described our invention, we claim:

1. In liquid dispensing apparatus of the character described, a tank adapted to contain a supply of liquid, a container located in said tank so as to be submerged in the liquid, means operable to put said container in communication with said tank by establishing a liquid passage therebetween of a size to cause the container to be filled relatively quickly and said means being operable to thereafter seal the container, conduit means extending from said container to the liquid delivery point and having communication with the container at a distance below the top corresponding with the desired volume of liquid to be delivered, and means for introducing air pressure into said container to discharge liquid therefrom through said conduit means.

2. In liquid dispensing apparatus of the character described, a tank adapted to contain a supply of liquid, a container located in said tank so as to be submerged in the liquid, means operable to put said container in communication with said tank by establishing a liquid passage therebetween of a size to cause the container to be filled relatively quickly and said means being operable to thereafter seal the container, conduit means extending from said container to the liquid delivery point and having communication with the container at a distance below the top corresponding with the desired volume of liquid to be delivered, means for introducing air pressure into said container to discharge liquid therefrom through said conduit means, and means whereby the point of communication between the container and conduit means may be varied with respect to the top of the container for determining the volume of liquid to be delivered.

3. In battery filling apparatus, a tank adapted to contain a supply of acid, an open-topped substantially cylindrical container located in said tank so as to be submerged in the acid, a cover engageable with the open top of the container to seal said container and adapted to be lifted to permit the container to be quickly filled with acid, conduit means extending from said container to the acid delivery point, means for introducing air pressure into said container to discharge acid therefrom through the conduit means, said conduit means including a pipe which extends into the container and is shiftable to vary the spacing of its open end below the top of the container, and means for shifting said pipe to vary said spacing in accordance with the volume of acid to be discharged.

4. In battery filling apparatus, a tank adapted to contain a supply of acid, a container located in the tank so as to be submerged in the acid, a cover for the container, means operable to lift said cover to admit acid into the container and to thereafter apply the cover to seal the container, conduit means extending from the container to the delivery point including a pipe extending through said cover, and means for introducing air pressure into the container to discharge acid therefrom through said conduit means.

5. In liquid dispensing apparatus of the character described, a tank adapted to contain a supply of liquid, a container located in the tank so as to be submerged in the liquid, a cover for the container, means operable to lift said cover to admit liquid into the container and to thereafter apply the cover to seal the container, conduit means extending from the container to the delivery point including a pipe extending through said cover, means for introducing air pressure into the container to discharge liquid therefrom through said conduit means, said pipe being movable in said cover to vary the distance which it extends into the container, and means for moving said pipe.

6. In liquid dispensing apparatus of the character described, a stationary tank adapted to contain a supply of liquid, a container located in the tank so as to be submerged in the liquid, air pressure responsive means operable to place the container in communication with the tank to receive liquid therefrom and to thereafter seal the container, a source of air under pressure, a portable device having thereon a liquid delivery nozzle and a normally open air discharge orifice, conduit means connecting the container with said delivery nozzle, and means connecting said source with said pressure responsive means, said container and with said orifice so that closure of the orifice will cause air pressure to build up in and actuate said pressure responsive means for opening and closing the container and in the container for discharging liquid therefrom through said conduit means.

7. In liquid dispensing apparatus of the character described, a tank adapted to contain a supply of liquid, a container located in the tank so as to be submerged in the liquid, means operable to place the container in communication with the tank to receive liquid therefrom and to thereafter seal the container, a source of air under pressure, a portable device having thereon a liquid delivery nozzle and a normally open air discharge orifice, conduit means connecting the container with said delivery nozzle, an air conduit connecting said air source with said container for supplying air pressure to the latter, a solenoid valve in said air conduit, a second air conduit leading to said orifice, and a switch responsive to pressure in said second air conduit and controlling said solenoid valve.

8. In battery filling apparatus, a container for acid, a removable cover, reciprocably operable means connected with the cover for applying said cover to the top of the container to seal the same, a delivery conduit extending through the cover and projecting into the container a distance corresponding with the volume of acid to be dispensed therefrom, and means for introducing air pressure into the container for forcing said volume of acid therefrom through said conduit.

9. In liquid dispensing apparatus of the character described, a container for liquid, a removable cover, reciprocably operable means connected with the cover for applying said cover to the top of the container to seal the same, a delivery conduit extending through the cover and projecting into the container a distance corresponding with the volume of liquid to be dispensed therefrom, means for introducing air pressure into the container for forcing said volume of liquid therefrom, said conduit being movable up or down in the cover for varying the distance which the conduit extends into the container, and means operable to cause such up or down movement of said conduit.

10. In liquid dispensing apparatus of the character described, a container for liquid, a hollow spindle extending above the container and at its lower end carrying a cover for the container, said spindle being axially movable for removing the cover from the container and for applying the same to seal the container, and a delivery conduit leading from the container including a tube extending through the spindle opening and cover, said tube being axially movable in the spindle to vary the distance to which it extends into the container to thereby determine the volume of liquid to be dispensed, the opening of the spindle being larger than the tube to provide a passage for introducing air under pressure into the container.

11. In dispensing apparatus of the character described, a support having thereon a tank adapted to contain a supply of liquid, a container located in said tank so as to be submerged in said liquid, means providing a guideway on said support above said tank, means movable in said guideway and extending into the tank to a point adjacent the top of said container, a cover for the container mounted on the lower end of said movable means, conduit means leading from the container including a tube extending through said cover, a power device on said support and operably connected with said movable means to actuate the same for removing the cover from the container and for reapplying the same to seal the container, and means for introducing air pressure into the container.

12. In dispensing apparatus of the character described, a support having thereon a tank adapted to contain a supply of liquid, a container located in said tank so as to be submerged in said liquid, means providing a guideway on said support above said tank, a member movable in said guideway toward and from said tank and carrying a hollow spindle, a cover for the container mounted on the lower end of said spindle, conduit means leading from said container including a tube extending through the spindle opening and cover, a power device on said support and operably connected with said movable member to actuate the same for removing the cover from the container and for reapplying the same to seal the container, and means for introducing air pressure into the container.

13. In dispensing apparatus of the character described, a support having thereon a tank adapted to contain a supply of liquid, a container located in said tank so as to be submerged in said liquid, means providing a guideway on said support above said tank, a member movable in said guideway toward and from said tank and carrying a hollow spindle, a cover for the container mounted on the lower end of said spindle, a power device on said support and operably connected with said movable member to actuate the same for removing the cover from the container and for reapplying the same to seal the container, a slide on said member carrying a tube which extends through said hollow spindle and cover, means for adjusting the position of the slide on said member for varying the distance which said tube projects into the container, and means for introducing air pressure into the container for forcing liquid out through said tube.

14. In dispensing apparatus of the character described, a support having thereon a tank adapted to contain a supply of liquid, a container located in said tank so as to be submerged in said liquid, means providing a guideway on said support above said tank, a member movable in said guideway toward and from said tank and carrying a hollow spindle, a cover for the container mounted on the lower end of said spindle, an air cylinder on said support operably connected with said member to actuate the same for removing the cover from the container and for reapplying the same to seal the container, a portable device having thereon a liquid delivery nozzle and a normally open air-discharge orifice, conduit means leading from the container to said nozzle including a tube extending through the spindle opening and cover, a source of air under pressure, air conduit means leading from said source to said cylinder and to said container, a solenoid valve controlling said air conduit means, another air conduit leading to said orifice, and a switch responsive to pressure in the latter conduit and controlling said solenoid valve.

15. Apparatus for simultaneously filling the cells of a multiple cell storage battery, comprising a support having thereon a tank adapted to contain a supply of electrolyte and a guideway above the tank, containers corresponding in number with the cells of the battery and arranged in said tank so as to be submerged in the electrolyte, a frame movable in said guideway, covers carried by the frame for the respective containers, a power device connected with said frame to actuate the same in said guideway for removing the covers from the containers and for reapplying the same to seal the containers, a portable device having nozzles spaced to enter the battery cells, conduits leading from said containers to said nozzles, and means for supplying air pressure to the containers for forcing electrolyte therefrom through said conduits.

16. Apparatus for simultaneously filling the cells of a multiple cell storage battery, comprising a support having thereon a tank adapted to contain a supply of electrolyte and a guideway above the tank, containers corresponding in number with the cells of the battery and arranged in said tank so as to be submerged in the electrolyte, a frame movable in said guideway, hollow spindles depending from said frame and carrying covers for the respective containers, a power device connected with said frame to actuate the same in said guideway for removing the covers from the containers and for reapplying the same to seal the containers, a slide shiftable on said frame and carrying depending tubes which extend through the hollow spindles and covers into the containers, means for shifting said slide on the frame to vary the distance which said tubes extend into the containers, a portable device having nozzles spaced to enter the battery cells, conduits connecting the outer ends of said tubes with said nozzles, and means for supplying air pressure to the containers for forcing electrolyte therefrom through said tubes and conduits.

17. In battery filling apparatus, a tank adapted to contain a supply of acid, an upright open-topped substantially cylindrical container located in said tank so as to be submerged in the acid, a reciprocable cover for said container, said cover being shiftable away from said container to permit the latter to be quickly filled from said tank and into engagement with the top of the container to close the same after filling, conduit means extending from said container to the acid delivery point, and means for introducing air pressure into said container to discharge acid therefrom through the conduit means.

18. In liquid dispensing apparatus, a tank having therein a supporting member and being adapted to contain a supply of liquid, an upright open-topped substantially cylindrical container located on said supporting member so as to be submerged in the liquid, a reciprocable cover member for said container, said cover member being shiftable away from the container to permit the latter to be quickly filled from said tank and into engagement with the top of the container to close the same after filling, and conduit means extending from said container for discharging the liquid therefrom, one of said members having a resilient container-engaging portion adapted to yield when said cover member is applied to said container.

19. In liquid dispensing apparatus, a tank adapted to contain a supply of liquid, an upright open-topped container located in said tank so as to be submerged in the liquid, a reciprocable cover for said container, said cover being shiftable away from the container to permit the latter to be quickly filled from said tank and into engagement with the top of the container to close the same after filling, and conduit means extending from said container for discharging the liquid therefrom, said cover having a depending skirt surrounding the upper portion of the container for guiding cooperation therewith.

20. In liquid dispensing apparatus, a tank adapted to contain a supply of liquid, an upright open-topped container located in said tank so as to be submerged in the liquid, a reciprocable cover for said container, said cover being shiftable away from the container to permit the latter to be quickly filled from said tank and into engagement with the top of the container to close the same after filling, and conduit means extending from said container for discharging the liquid therefrom, said cover having a depending skirt surrounding the upper portion of the container, said skirt being of greater length than the reciprocable movement of the cover so that a portion of the skirt will always surround the top of the container to prevent misalignment between the container and cover.

21. In liquid dispensing apparatus, a tank adapted to contain a supply of liquid, an upright open-topped container located in said tank so as to be submerged in the liquid, a reciprocable cover for said container, said cover being shiftable away from the container to permit the latter to be quickly filled from said tank and into engagement with the top of the container to close the same after filling, and conduit means extending from said container for discharging the liquid therefrom, said cover having a depending skirt surrounding the upper portion of the container, said skirt being of greater length tahn the reciprocable movement of the cover so that a portion of the skirt will always surround the top of the container to prevent misalignment between the container and cover and said skirt having openings therein of a size to permit liquid to flow freely to said open top of the container when the cover is lifted.

ARTHUR O. CODNEY.
ROBERT M. BAILEY.